(12) United States Patent  (10) Patent No.: US 7,423,238 B2
Stanzel et al.  (45) Date of Patent: Sep. 9, 2008

(54) GAS SYSTEM FOR WIRE FEEDING DEVICES

(75) Inventors: Kenneth A. Stanzel, Appleton, WI (US); John Breitbach, Greenville, WI (US); Ronald Woodward, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 187 days.

(21) Appl. No.: 10/906,762

(22) Filed: Mar. 4, 2005

(65) Prior Publication Data

US 2005/0252899 A1  Nov. 17, 2005

Related U.S. Application Data

(63) Continuation-in-part of application No. 10/709,540, filed on May 12, 2004.

(51) Int. Cl.
 *B23K 9/133* (2006.01)
 *B23K 9/16* (2006.01)

(52) U.S. Cl. .................................. 219/137.2; 219/74

(58) Field of Classification Search ............ 219/74, 219/137.2

See application file for complete search history.

(56) References Cited

U.S. PATENT DOCUMENTS

| | | | |
|---|---|---|---|
| 3,458,681 A | 7/1969 | Forrester | |
| 4,521,672 A | 6/1985 | Fronius | |
| 4,702,277 A | 10/1987 | Ollivier | |
| 5,472,024 A | 12/1995 | Brugerolle et al. | |
| 5,507,531 A | 4/1996 | Aldridge | |
| 5,791,328 A | 8/1998 | Alexander | |
| 5,904,133 A | 5/1999 | Alexander et al. | |
| 5,950,611 A | 9/1999 | Lopez et al. | |
| 6,213,111 B1 | 4/2001 | Alexander et al. | |
| 6,225,596 B1 | 5/2001 | Chandler et al. | |
| 6,227,187 B1 | 5/2001 | Alexander et al. | |
| 6,248,975 B1 * | 6/2001 | Lanouette et al. | 219/130.21 |
| 6,303,891 B1 * | 10/2001 | Gault | 219/74 |
| 6,343,599 B1 | 2/2002 | Perrone | |
| 6,405,722 B2 | 6/2002 | Colby | |
| 6,474,325 B2 | 11/2002 | Rice | |
| 6,543,475 B2 | 4/2003 | Colby | |
| 6,644,295 B2 | 11/2003 | Jones | |
| 6,675,791 B1 | 1/2004 | Alexander et al. | |
| 6,977,358 B2 * | 12/2005 | Albrecht et al. | 219/130.1 |
| 2005/0000946 A1 | 1/2005 | Albrecht et al. | |

FOREIGN PATENT DOCUMENTS

| | | |
|---|---|---|
| DE | 2650522 A | 5/1978 |
| DE | 8308999.3 U1 | 11/1983 |
| JP | 53-67657 A | 6/1978 |
| JP | 60-64769 * | 4/1985 |
| JP | 60-64769 A | 4/1985 |
| JP | S60-64769 | 4/1985 |
| SU | 245241 | 11/1969 |

* cited by examiner

*Primary Examiner*—Kevin P Kerns
(74) *Attorney, Agent, or Firm*—Ziolkowski Patent Solutions Group, SC (57) ABSTRACT

A wire feeder and gas system for use therewith is shown. The gas system of the wire feeder includes a canister that is constructed to contain a shielding gas therein and is connectable to the wire feeder. The canister is supported by the wire feeder when it is connected thereto such that the wire feeder can be efficiently and conveniently transported from one location to another with the source of shielding gas securely connected thereto.

25 Claims, 7 Drawing Sheets

GAS SYSTEM FOR WIRE FEEDING DEVICES

CROSS-REFERENCE TO RELATED APPLICATIONS

The present application is a Continuation in Part of U.S. patent application Ser. No. 10/709,540 filed on May 12, 2004.

BACKGROUND OF THE INVENTION

The present invention relates generally to welding systems and, more particularly, to a gas system for providing shielding gas to a weld.

Welder power sources have become increasingly portable in recent years. This portability is largely the result of lighter unit weight and improved electrical components. One advancement in the area of electrical components has been the incorporation of inverter-type power sources. The application of an inverter power source has reduced the size and weight of welders and created usable space within the confines of the housing, while maintaining the ability to generate the outputs required for welding.

Improvements in wire feeder technology have also improved the ease of use and portability of a welder. Wire welding is generally believed to be easier to learn than conventional stick welding and as such, relatively inexperienced artisans can produce adequate results in relatively little time. As a result, due to the ease of use and versatility of application, many users prefer wire welding over conventional stick welding.

Space in any work environment is always at a premium. Whether the welder is used in the hobbyist's garage or the machine shop of an industrial plant, the size of the unit is always a design consideration. The space used by a welder is not limited to the dimensions of the power source itself but includes the ancillaries related to welding processes such as cables, consumables, and gas cylinders. The space required for the storage and maintenance of these items is another consideration associated with many welders.

Shielding gas containers, commonly referred to as gas cylinders, provide gas to the welding process. This gas essentially encapsulates the welding process in order to protect the integrity of the weld from contaminants and also enhances arc performance during a welding process. The shielding gas is generally provided in very large and very heavy cylinders. The cylinders are constructed ruggedly to withstand the high pressure of the gas contained therein and the rigors of the workplace. A regulator and valve assembly are typically attached to the gas cylinder and allow the operator of the welding power source to control the amount of gas supplied to the welding process.

The size and weight of the gas cylinders significantly detracts from the portability of the welder. Additionally, attempts to move the welder and gas cylinder together presents an opportunity for inadvertent damage to the gas cylinder or to the regulator attached thereto unless a cart is provided. Such carts however are large and typically constructed to accommodate bulky gas cylinders. As such, the portability of the welding apparatus is limited by the portability of the shielding gas cylinder.

Additionally, although welders have become increasingly transportable, there are instances when even greater portability and/or versatility of welding-type devices is desired. One such device is a wire feeder that is remotely positionable with respect to a welding-type power source. Though the components of the wire feeder are remotely positionable relative to the power source configured to generate the power signal suitable for welding-type applications, the portability of the wire feeder is limited by the connectivity of the wire feeder to a shielding gas source. Often the wire feeder is connected directly to a gas source or is connected to a shielding gas source through the power source. Either configuration limits the range of portability of the wire feeder by the length of gas hose extending between the gas source and the wire feeder.

Understandably, while the gas source is "moveable", the source of shielding gas is provided in a gas cylinder that has substantial size and mass. As such, movement of the gas cylinder is often limited by an operator's physical ability of move the cylinder or the surrounding environment where the gas cylinder is to be moved. That is, in certain work environments it may be impractical or impossible to maneuver the equipment necessary to move the gas cylinder to a desired location remote from the welding-device power source.

It would therefore be desirable to design a welding-type device having a shielding gas system that is lightweight and highly portable remote from a welding-type power source.

BRIEF DESCRIPTION OF THE INVENTION

The present invention is directed to a wire feeder having a shielding gas system that solves the aforementioned drawbacks. The wire feeder is constructed to provide a portable source of shielding gas to a weld. A pressure vessel is removeably supported by the wire feeder such that the wire feeder is efficiently and conveniently transportable by a single person and has a source of shielding gas securely supported thereby.

Therefore, in accordance with one aspect of the present invention, a wire feeder having a source of shielding gas is disclosed. The wire feeder has a hub constructed to support a consumable weld wire and a drive assembly constructed to deliver the consumable weld wire to a weld. A housing is positioned about the hub and the drive assembly. A pressure vessel is supported by the wire feeder and is constructed to contain a gas therein. A valve is attached to the pressure vessel and is constructed to allow passage of the gas from the pressure vessel upon engagement of the pressure vessel with the wire feeder.

According to another aspect of the present invention, a weld wire delivery system is disclosed. The weld wire delivery system has a consumable weld wire supported in an enclosure having a receptacle formed therein. A drive mechanism is constructed to engage the consumable weld wire and deliver the consumable weld wire to a weld. The weld wire delivery system includes a regulator is positioned in, and supported by, the receptacle of the enclosure.

In accordance with a further aspect of the present invention, a wire feeder having a housing with a cavity formed therein is disclosed. The cavity formed in the housing is constructed to receive a supply of a weld wire therein. A feed drive mechanism is in fluid communication with the cavity and is constructed to remove the weld wire therefrom. The wire feeder also includes first means for providing a shielding gas to a weld and second means for providing shielding gas to a weld. The first providing means originates in the housing and the second providing means originates outside the housing.

Therefore, the present invention provides a highly portable and versatile welding-type system having a shielding gas system that is lightweight and easily transportable. Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

As one skilled in the art will fully appreciate, the hereinafter description of welding devices not only includes welders but also includes any system that requires high power outputs that can benefit from the use of a compressed shielding gas. Such systems can include heating and cutting systems. Description of a welding-type apparatus or device illustrates just one embodiment in which the present invention may be implemented.

Figure 1:
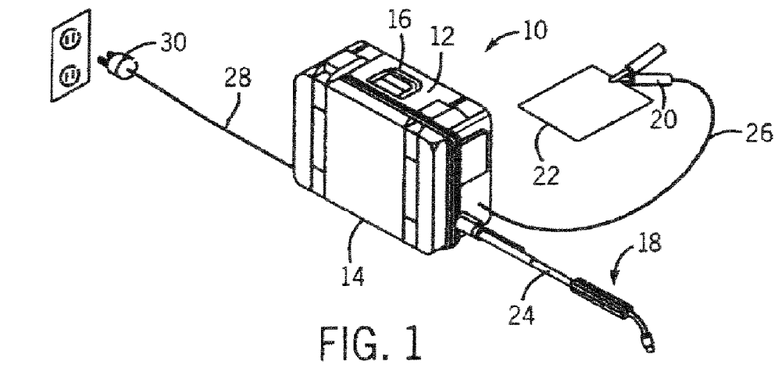
FIG. 1 is a perspective view of an exemplary power source incorporating one embodiment of the present invention.

Referring to FIG. 1, a perspective view of a welding device incorporating the present invention is shown. Welding device 10 includes a housing 12 enclosing the internal components of the welding device under a cover 14. The welding device 10 includes a handle 16 for transporting the welding system from one location to another. Although shown as a "suitcase" welding device, capable of being easily transported by one person, the present invention is equally applicable to larger welding devices which may have more limited portability. To effectuate the welding process, such as TIG or MIG welding, the welding device includes a torch 18 as well as a work clamp 20. The work clamp 20 is configured to complete an electrical circuit from torch 18 through workpiece 22. As is known, when the torch 18 is in relative proximity to workpiece 22, a welding arc or cutting arc results, depending upon the particular welding desired. A pair of cables 24 and 26 connects the torch 18 and work clamp 20 to the housing 12, respectively. A power cable 28 extends from welding device 10 and is connectable to a variety of inputs. As shown, power cable 28 includes a plug 30 constructed to engage an electrical outlet and supply power to welding device 10 from a power grid. It is understood power cable 28 can be configured to communicate power to welding device 10 from any type of power source, including an engine driven generator, a power grid, a battery, etc.

Figure 2:
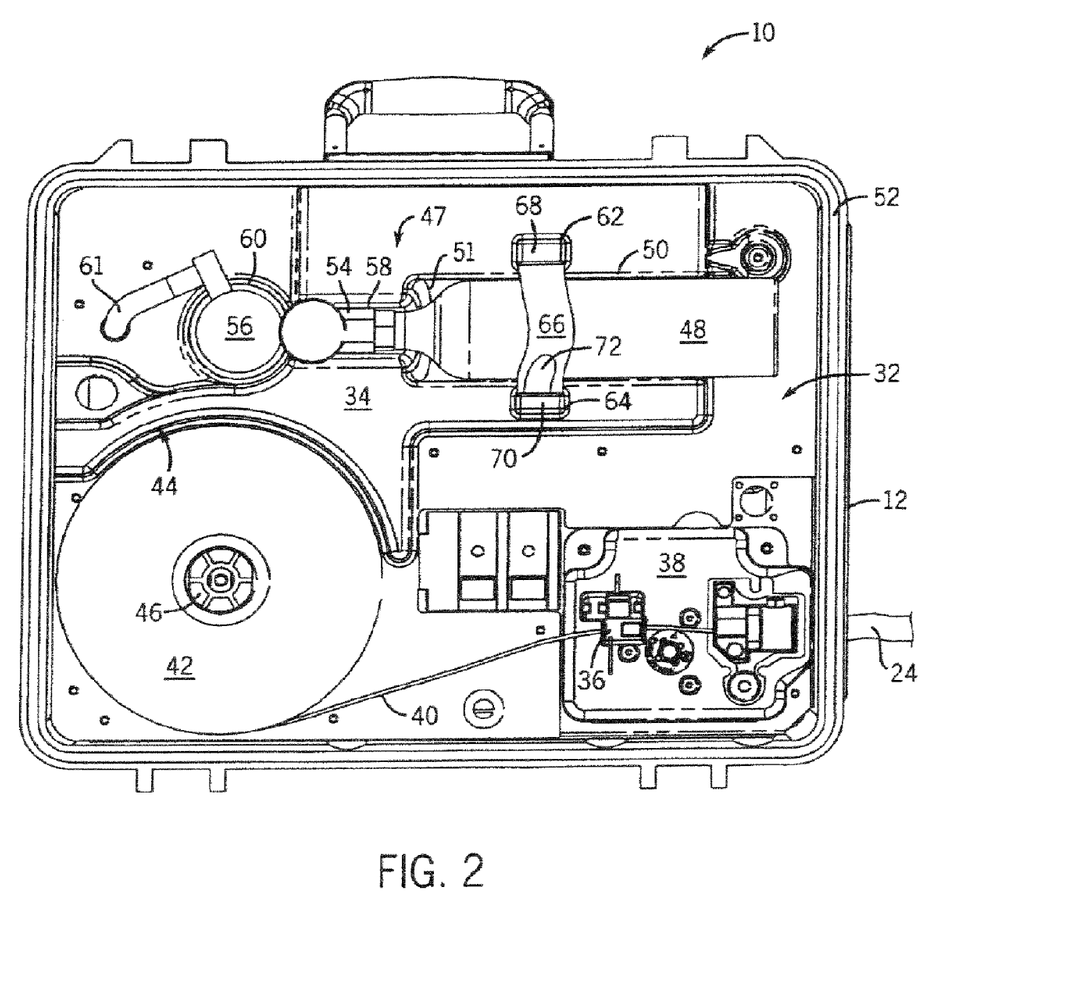
FIG. 2 is a side elevational view of the power source of FIG. 1 with a cover removed.

FIG. 2 shows welding device 10 with cover 14 removed therefrom. Having cover 14 removed exposes an internal cavity 32 of welding device 10. A shroud 34 separates a majority of internal cavity 32 so that removing cover 14 does not expose a majority of the electronic components of the welding device. A wire guide 36 and a wire feed 38 are positioned proximate the connection of cable 24 in housing 12. A guide wire 40 is drawn from a spool 42 by wire feed 38 to the torch through cable 24. Shroud 34 has a curved portion 44 to accommodate the positioning of spool 42 on a hub 46 of welding device 10. A shielding gas system 47 includes a gas cylinder 48 constructed to snuggly engage a first portion 50 of a recess 51 formed in shroud 34. Although gas cylinder 48 is shown in a generally horizontal orientation relative to welding device 10, such an orientation is merely exemplary. It is understood that gas cylinder 48 could be positioned in any orientation and could be located entirely within a perimeter 52 of housing 12 as shown, partially within housing 12, or external to the housing, if desired.

Shielding gas system 47 includes an adapter 54 and a regulator 56. Adapter 54 is fluidly connected between gas cylinder 48 and regulator 56 of shielding gas system 47. Adapter 54 engages gas cylinder 48 and allows shielding gas to flow from gas cylinder 48 to regulator 56 immediately upon connection thereto, as will later be described in more detail with reference to FIGS. 4-7 and 9. Adapter 54 is constructed to be snuggly positioned in a second portion 58 of recess 51. Regulator 56 is positioned in a third portion 60 of recess 51 and is fluidly connected to the torch of welding device 10 via a hose 61 and controls the amount of shielding gas provided to the torch during a welding operation. Optionally, during operation of a welding process, a valve (not shown) is fluidly connected between torch 18 and regulator 56 such that the flow of shielding gas from shielding gas system 47 to torch 18 is only allowed when an operator has depressed a trigger or other actuator of torch 18.

Shroud 34 has a first boss 62 and a second boss 64 which generally flank gas cylinder 48. A strap 66 has a first end 68 pivotally connected to first boss 62 and a second end 70 constructed to engage second boss 64 of shroud 34. A latch 72 is pivotally connected to second end 70 of strap 66 and is constructed to removeably engage second boss 64 of shroud 34. Strap 66 spans gas cylinder 48 and secures the gas cylinder in recess 51. Latch 72 allows an operator to quickly remove and replace gas cylinder 48 from welding device 10.

Figure 3:
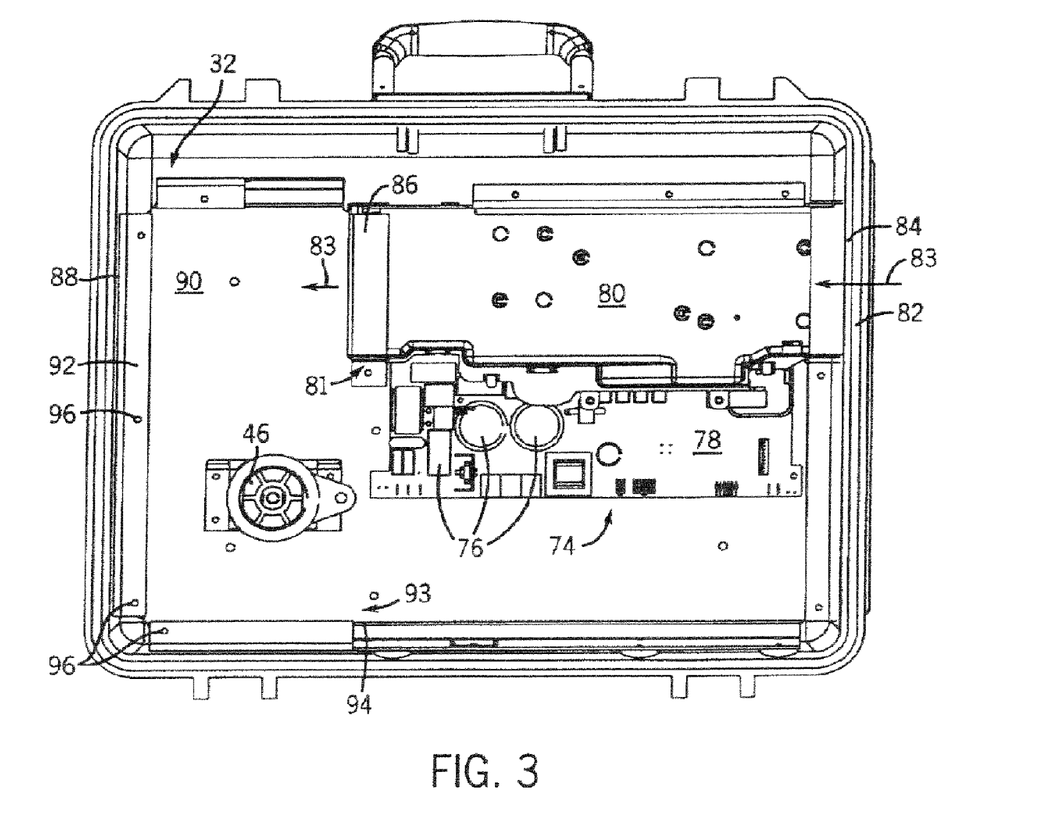
FIG. 3 is a side elevational view of the power source of FIG. 2 with a shroud and a shielding gas system removed.

Referring to FIG. 3, removing shroud 34 from internal cavity 32 of welding plurality of electrical components 76 attached to a circuit board 78. A wind tunnel 80 is attached about a portion 81 of circuit board 78. Wind tunnel 80 has a plurality of heat generating components (not shown) positioned thereabout. These heat generating components can include transformers, inductors, and core windings necessary to generate a power signal suitable for welding applications. Those components mounted within wind tunnel 80 are cooled by direct exposure to a flow of cooling air, indicated by arrow 83, through housing 12 of welding device 10. A fan (not shown) can also be located in the wind tunnel to facilitate moving sufficient amounts of cooling air through the welding device 10. A screen 82 is located over an inlet opening 84 formed in housing 12 and prevents particulates associated with a work environment from entering the housing of welding device 10. In addition to the heat generating components positioned within wind tunnel 80, or alternatively thereto, wind tunnel 80 is also constructed to accommodate heat sinks (not shown) therein. The heat sinks are thermally connectable to the electrical components 76 that are preferably positioned outside of wind tunnel 80. Such a construction maximizes cooling of all of the heat generating electrical components of power supply 74 while reducing the exposure of electrical components 76 to any particulates that may be carried on the cooling flow 83 through housing 12 of welding device 10.

Prior to entering wind tunnel 80, cooling flow 83 passes through internal cavity 32 of welding device 10 and cools electrical components 76 of welding device 10. Air that enters welding device 10 passes through wind tunnel 80, exits wind tunnel 80 at an outlet end 86, and exits the welding device through an exhaust vent 88 formed in housing 12. A mounting bracket 90 is positioned in internal cavity 32 and secures wind tunnel 80 and power supply 74 to housing 12. Hub 46 extends from mounting bracket 90 and is constructed to receive wire spool 42 shown in FIG. 2. Returning to FIG. 3, a flange 92 extends about a portion 93 of perimeter 94 of mounting bracket 90 and has a plurality of holes 96 formed therein. Holes 96 are positioned to receive corresponding bosses (not shown) that extend from shroud 34 and secure shroud 34, as shown in FIG. 2, to welding device 10. Alternatively, it is understood that shroud 34 could be attached to flange 92 with a plurality of threaded fasteners.

Figure 4:
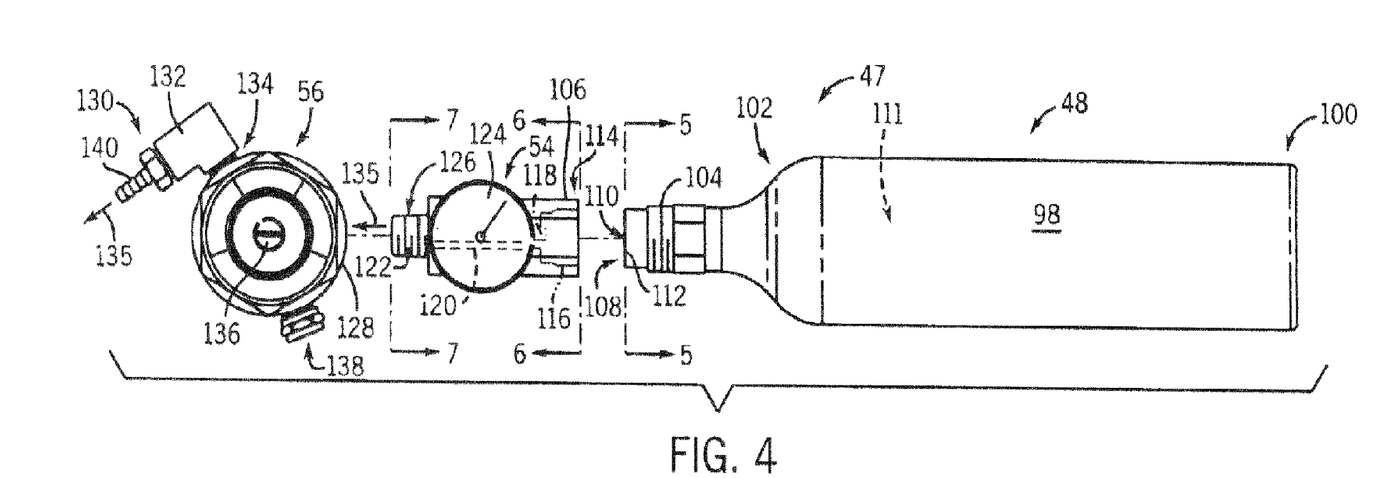
FIG. 4 is an exploded plan view of the shielding gas system of FIG. 2.

Referring to FIG. 4, the main components of shielding gas system 47 are shown separated from one another. Gas cylinder 48 has a body 98 which extends between a base portion 100 and a neck portion 102. Neck portion 102 has a threaded section 104 constructed to engage a first end 106 of adapter 54. Neck portion 102 of gas cylinder 48 has an opening 108 formed through neck portion 102. A valve 110 is positioned in opening 108 and operatively separates an internal cavity 111 of gas cylinder 48 from atmosphere. Valve 110 is biased to a closed position when gas cylinder 48 is separated from adapter 54 and prevents communication between internal cavity 111 of gas cylinder 48 and atmosphere. Valve 110 does not extend beyond an end face 112 of gas cylinder 48. Such a construction prevents the inadvertent venting of internal cavity 111 when gas cylinder 48 is not connected to adapter 54. Valve 110 is constructed integrally with gas cylinder body 98 and neck portion 102 to form a one-piece valve and gas cylinder 48.

Adapter 54 has a recess 114 (shown in phantom) formed in first end 106. A periphery 116 of recess 114 is threaded to engage threaded section 104 of gas cylinder 48. A nipple 118 extends into recess 114 of first end 106 of adapter 54 and is constructed to engage valve 110 of gas cylinder 48 upon connection of the gas cylinder to adapter 54. Such a construction allows the automatic actuation of valve 110 upon the connection of gas cylinder 48 to adapter 54 and results in the immediate communication of gas between internal cavity 111 and regulator 56. That is, by biasing valve 110 to an open position, nipple 118 allows passage of gas from internal cavity 111 of gas cylinder 48 into a passage 120 formed in adapter 54. In this manner, a manually operated valve is eliminated. Passage 120 fluidly connects first end 106 of adapter 54 with a second end 122 of adapter 54. A pressure gauge 124 is in fluid communication with passage 120 and indicates the pressure of shielding gas contained therein. Second end 122 of adapter 54 has a threaded portion 126 constructed to engage regulator 56. Although threaded portion 126 of second end 122 is shown in a male configuration and the threading of periphery 116 of recess 114 is shown in a generally female configuration, it is understood that these connections are merely exemplary and could vary depending on the connection configuration of the components being connected thereto.

Regulator 56 has an opening 128 formed therein and constructed to engage threaded portion 126 of second end 122 of adapter 54. An outlet 130 having an elbow portion 132 is connected to a second opening 134 formed in regulator 56. A gas passage, indicated by arrows 135, extends between opening 128 and outlet 130 and is interrupted by an adjusting screw 136. Manipulation of adjusting screw 136 regulates the flow of shielding gas through regulator 56 to outlet 130 and controls the amount of shielding gas provided to a welding-type device connected thereto. A relief valve assembly 138 is also fluidly connected to gas passage 135 of regulator 56 and allows for the controlled release of gas contained therein in the event that a pressure of gas in gas passage 135 exceeds a maximum operating pressure. Outlet 130 includes a rib portion 140 constructed to receive hose 61, shown in FIG. 2, thereabout. The gas hose connects regulator 56 to a welding-type device and fluidly communicates shielding gas to a torch.

Figure 5:
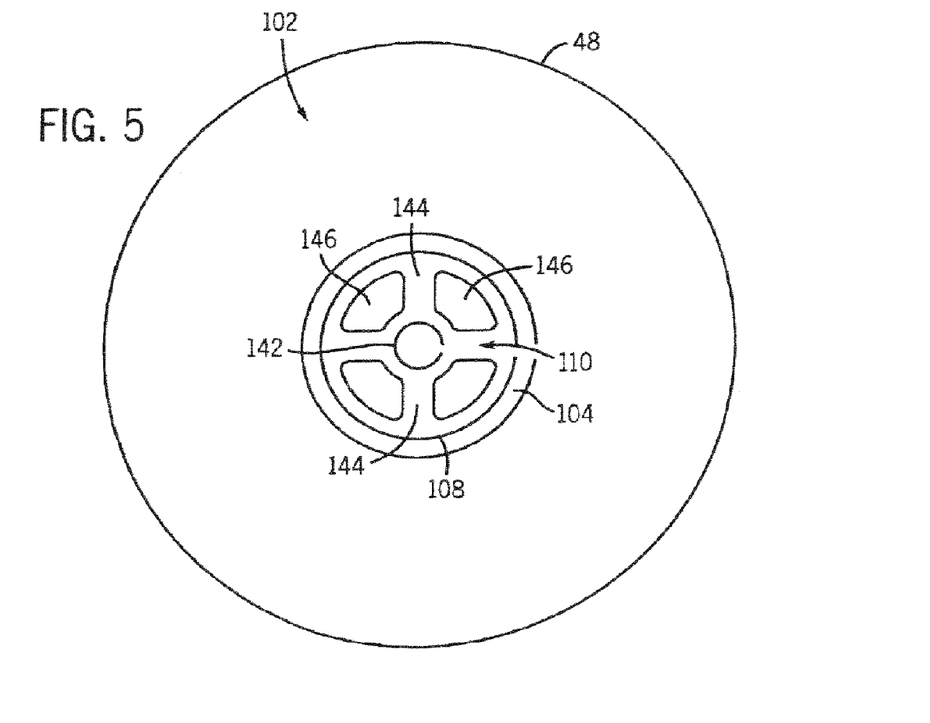
FIG. 5 is an end view of the gas cylinder taken along line 5-5 of FIG. 4.

FIG. 5 shows an end view of neck portion 102 of gas cylinder 48. Valve 110 is disposed in opening 108 of gas cylinder 48 and includes an actuator 142 generally centrally positioned therein. A plurality of ribs 144 are separated by a plurality of passages 146 and support actuator 142 in valve 110. Although biased closed, applying pressure to actuator 142 opens valve 110 and allows passage of shielding gas from within gas cylinder 48 through passages 146 and out of the gas cylinder. Threaded section 104 extends about valve 110 and has an axis of engagement generally coaxial with the axis of operation of actuator 142.

Figure 6:
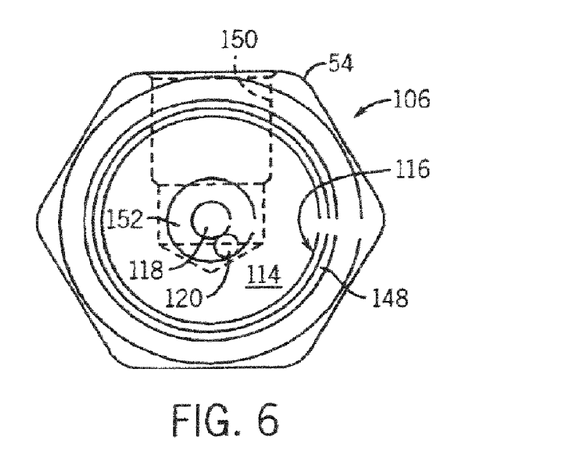
FIG. 6 is an end view of the adapter taken along line 6-6 of FIG. 4.
Figure 7:
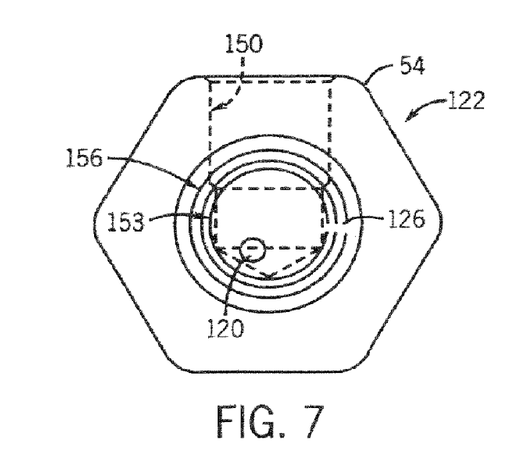
FIG. 7 is an end view of the adapter taken along line 7-7 of FIG. 4.

FIG. 6 shows an end view of first end 106 of adapter 54. A plurality of threads 148 extends about periphery 116 of recess 114. Nipple 118 extends into recess 114 and is generally concentric with threads 148. Passage 120 is offset from nipple 118 and passes through adapter 54 to second end 122 of adapter 54 as shown in FIG. 7. Returning to FIG. 6, a threaded opening 150 extends into adapter 54 and is in fluid communication with passage 120. Threaded opening 150 is constructed to receive a pressure gauge therein. Such a construction allows pressure gauge 124, shown in FIG. 4, to indicate the shielding gas pressure within passage 120. An annular groove 152 is formed about nipple 118 and provides for unobstructed passage of shielding gas from gas cylinder 48 to passage 120 upon connection of the gas cylinder to adapter 54. Upon connecting gas cylinder 48 to adapter 54, nipple 118 engages actuator 142 of valve 110 and immediately, automatically opens valve 110.

Referring to FIG. 7, a recess 153 is formed in second end 122 of adapter 54. Threaded portion 126 extends about a perimeter 156 of second end 122 and is constructed to threadingly engage regulator 56. Passage 120 fluidly communicates shielding gas to recess 154 which fluidly communicates shielding gas to regulator 56.

Figure 8:
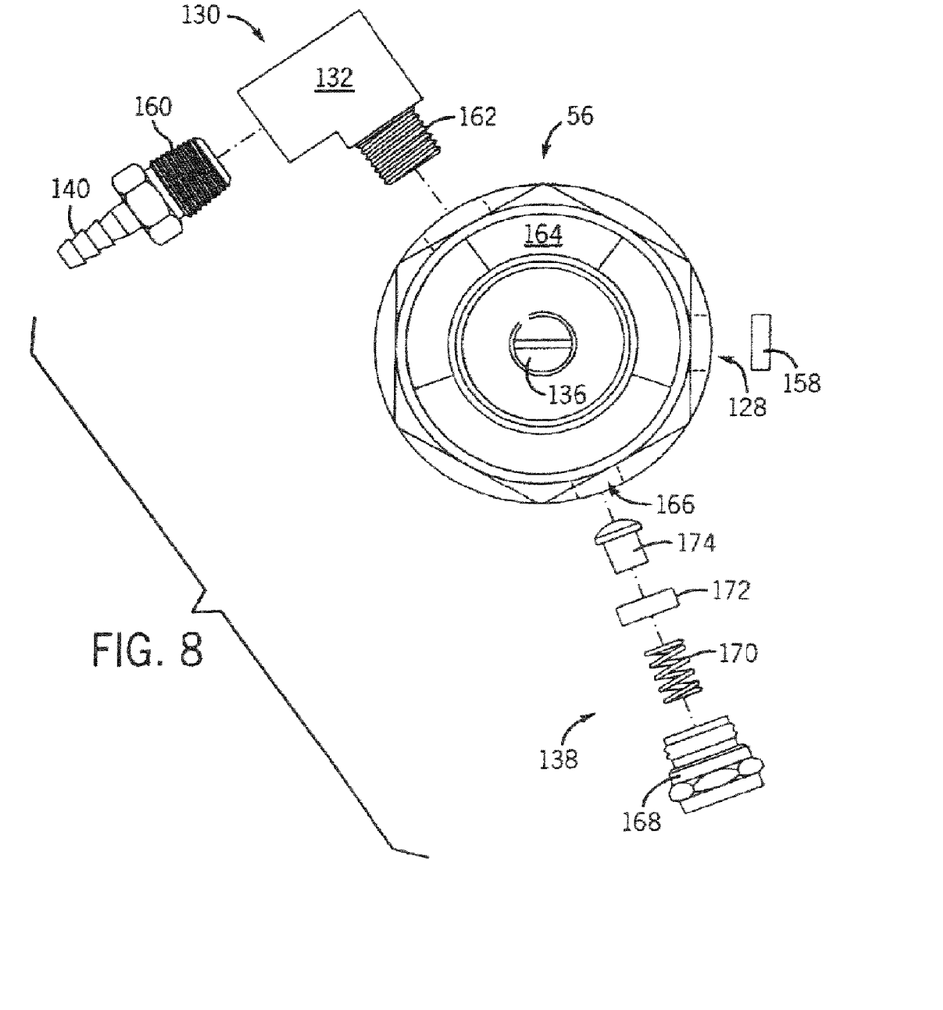
FIG. 8 is an exploded plan view of the regulator of the shielding gas system of FIG. 4.

Regulator 56 is shown in greater detail in FIG. 8. Opening 128 is constructed to receive a filter element 158 therein. Filter element 158 prevents the penetration of particulates that may be carried on the shielding gas flow through adapter 54 from passing into regulator 56. Outlet 130 has a threaded portion 160 opposite ribbed portion 140 constructed to threadingly engage elbow portion 132 of outlet 130. Elbow portion 132 includes a threaded portion 162 constructed to threadingly engage regulator 56. Adjusting screw 136 is rotatably connected to a body 164 of regulator 56 and allows operator control over an amount of shielding gas allowed to flow through regulator 56. A relief valve opening 166 is formed in regulator 56 and is constructed to receive a relief valve assembly 138 therein. A spring 170 biases a seat retainer 172 against a seat 174. A relief valve body 168 secures spring 170, seat retainer 172, and seat 174 within relief valve opening 166 of regulator 56. Relief valve assembly 138 allows for the pressure relief of shielding gas contained in regulator 56.

Figure 9:
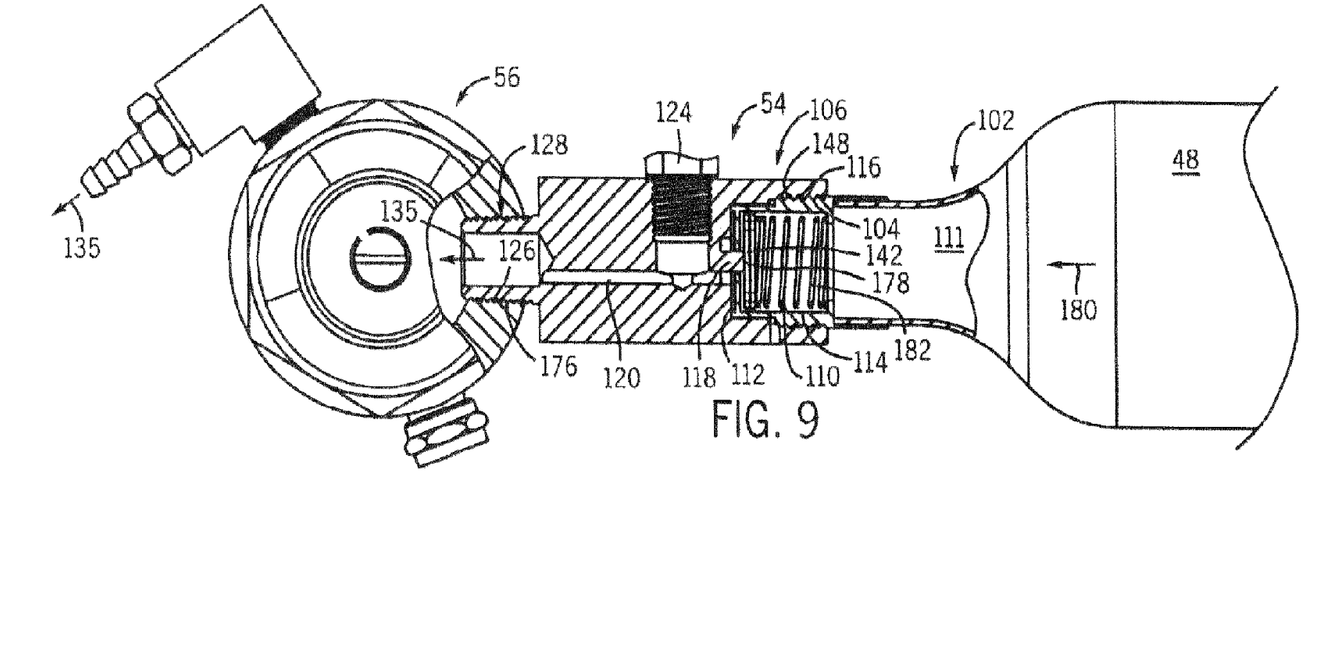
FIG. 9 is a side plan view of the shielding gas system of FIG. 2 in partial section.

As shown in FIG. 9, an inner periphery 176 of opening 128 of regulator 56 threadingly engages threaded portion 126 of adapter 54 and fluidly communicates shielding gas to flow passage 135 of regulator 56 from passage 120 of adapter 54. Pressure gauge 124 is also fluidly connected to passage 120 of adapter 54 and indicates the gas pressure therein. Threading 148 of periphery 116 of recess 114 of first end 106 of adapter 54 is threadingly connected to threaded section 104 of gas cylinder 48. When fully connected, end face 112 of neck portion 102 of gas cylinder 48 extends past an end 178 of nipple 118. End 178 of nipple 118 engages actuator 142 of valve 110 of gas cylinder 48 and fluidly connects cavity 111 of gas cylinder 48 with passage 120 of adapter 54. As gas cylinder 48 is threaded into recess 114 of adapter 54, nipple 118 displaces actuator 142 of valve 110 in a direction generally opposite the direction of engagement, indicated by arrow 180, of threaded section 104 of gas cylinder 48 and recess 114 of adapter 54 thereby opening valve 110. A spring 182 biases valve 110 to a closed position when actuator 142 is not biased by nipple 118 of adapter 54. Upon connection of gas cylinder 48 to adapter 54, shielding gas contained within internal cavity 111 of gas cylinder 48 is allowed to flow through passage 120 of adapter 54 and into regulator 56. Such a connection automatically opens valve 110 of gas cylinder 48 upon connection of the gas cylinder to adapter 54 without requiring the manipulation of an additional valve.

Figure 10:
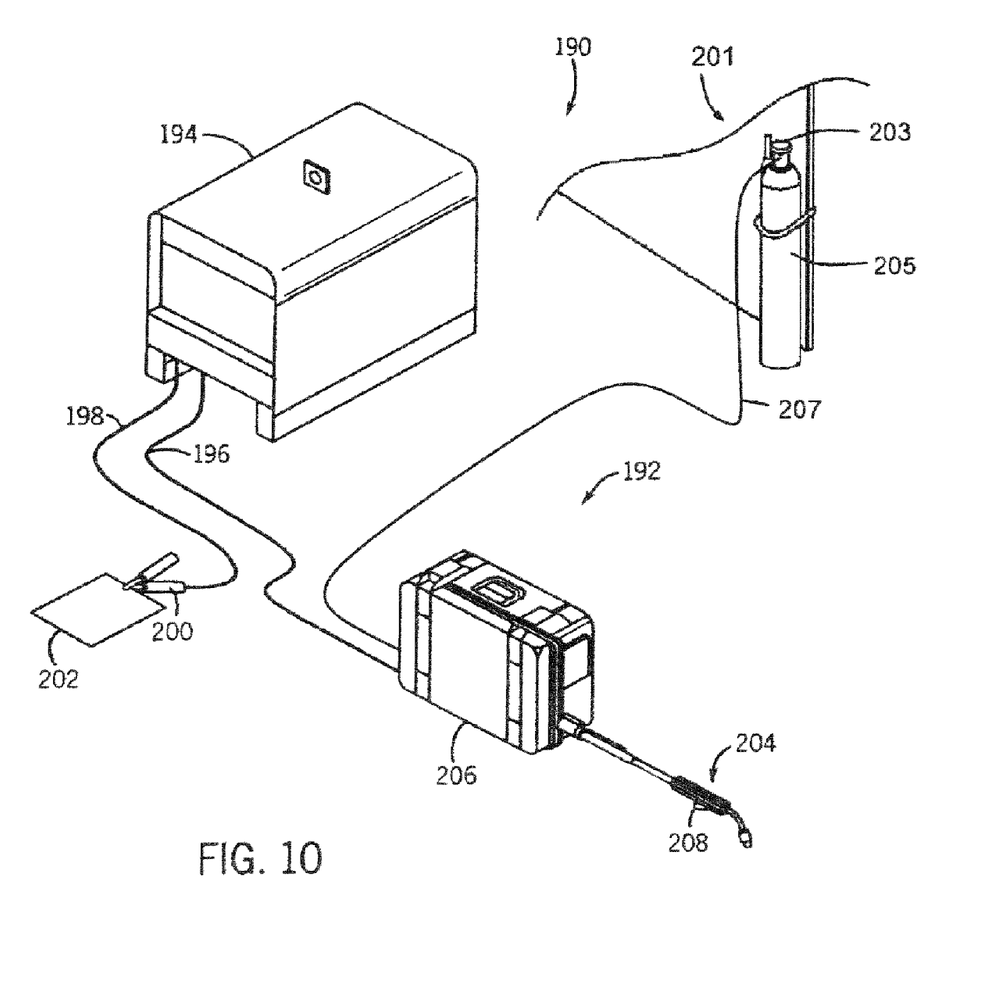
FIG. 10 is a perspective view of a welding-type system incorporating another embodiment of the present invention.

FIG. 10 shows another welding-type system 190 incorporating another embodiment of the present invention. As shown in FIG. 10, a wire feeder 192 is connected to a welding power source 194. Wire feeder 192 can communicate the welding-type power generated by welding power source 194 to a weld but is incapable of independently generating such power. Welding power source 194 is constructed to supply power to wire feeder 192 through a weld cable 196. Also connected to the power source is a secondary work weld cable 198 that connects the power source to a clamp 200 constructed to electrically connect cable 198 to a workpiece 202. It is also understood that work weld cable 198 could extend between wire feeder 192 and workpiece 202 similar to cable 26 shown in FIG. 1. Additionally, although wire feeder 192 is shown connected to a welding power source 194 that is not necessarily constructed with an emphasis on ease of mobility, it is understood that wire feeder 192 could be powered by a power source constructed similar to welding device 10 shown in FIG. 1. Regardless of the size and mobility of the power source attached to wire feeder 192, wire feeder 192 is remotely positionable relative thereto.

A welding gun or torch 204 is connected to wire feeder 192 and extends therefrom and is configured to supply consumable welding wire to a weld. Comparing wire feeder 192 shown in FIG. 10 and welding device 10 shown in FIG. 1, it can be appreciated that an operator desiring to perform a welding process must only transport the wire feeder components of the welding system. Accordingly, an operator desiring to perform various remote welding processes will appreciate the reduction in size and mass of the transportable component of the welding system shown in FIG. 10. Additionally, being required to contain less components than housing 12 of the welding-type device 10 shown in FIG. 1, a housing 206 formed about wire feeder 192 is smaller than housing 12 thereby allowing the wire feeder 192 of welding system 190 shown in FIG. 10 to be positioned in even more confined or restricted work locations than the highly portable welding-type device 10 shown in FIG. 1.

Power source 194 is constructed to condition raw power supplied from a utility line or engine driven power supply and output power usable by a welding process. The output of the power source is generally controlled by a controller and associated operational circuitry that regulates the secondary or output side of the power conditioning components. Preferably, power source 194 is regulated such that a secondary or welding power output is not provided until trigger 208 of gun 204 is activated signaling commencement of a welding process. In this regard, a welding circuit is not created between power source 194 and workpiece 202 until trigger 208 of gun 204 is activated and a consumable wire is placed in relative proximity with workpiece 202.

Trigger 208 of torch 204 causes wire feeder 192 to communicate command signals to power source 194 thereby causing the power source to provide a power signal suitable for welding to torch 204 when trigger 208 is depressed. Wire feeder 192 is designed to be a portable or a "suitcase" wire feeder such that a further reduction in weight of the portable components of the welding system is clearly advantageous. As such, constructing wire feeder 192 to operate with a separate power source and associated components reduces the overall weight and size of the wire feeder thereby reducing operator fatigue associated with repeatedly repositioning the portable components of the welding system.

An optional bulk gas system 201 containing a shielding gas, such as weld-grade $CO_2$, is connected to wire feeder 192 such that, when the wire feeder is operated in relatively close proximity to power source 194, bulk gas system 201 can be attached to wire feeder 192 to provide a shielding gas thereto. Bulk gas system 201 includes a regulator 203 attached to a pressure vessel 205 of optional bulk gas system 201. A gas hose 207 connects wire feeder 192 to optional bulk gas system 201 thereby fluidly connecting wire feeder 192 and pressure vessel 205. Alternatively, it is understood that the flow of gas from bulk gas system 201 could be directed through power source 194 and directed from the power source to wire feeder 192.

Figure 11:
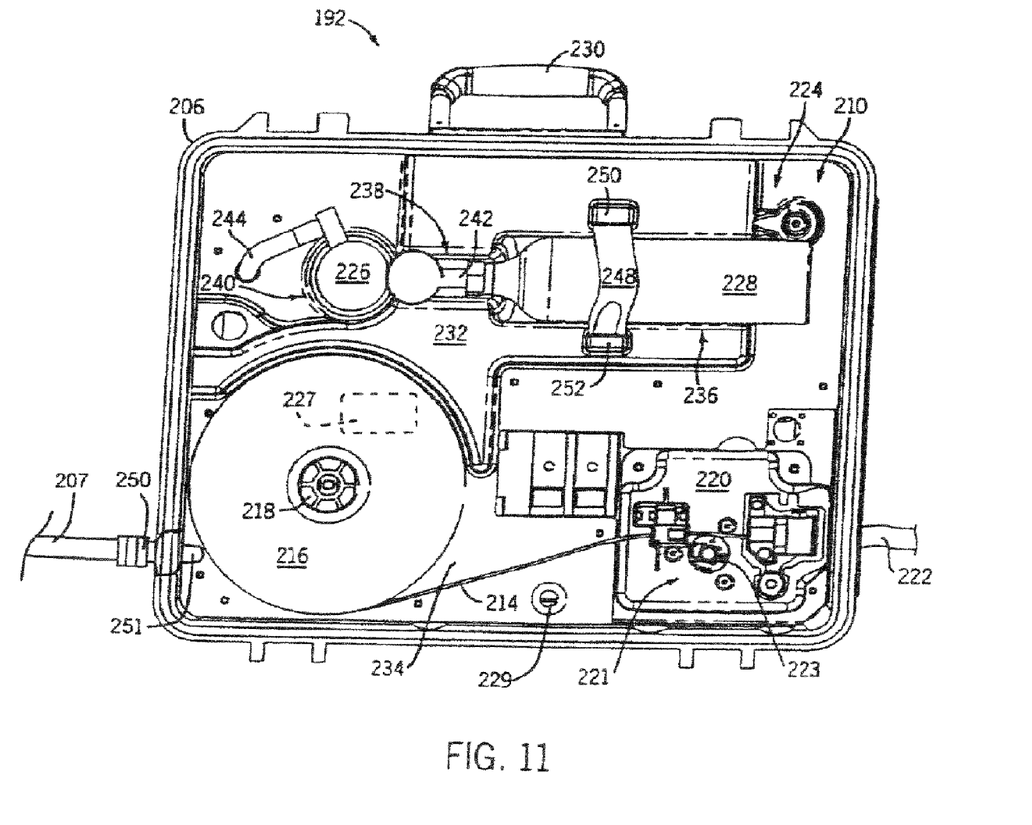
FIG. 11 is an elevational view of the wire feeder of the welding-type system of FIG. 10 with a cover removed therefrom exposing the gas system supported thereby.

As shown in FIG. 1, an internal cavity 210 of wire feeder 192 is shown with the components located therein arranged generally similar to the internal cavity 32 of the power source 10 shown in FIG. 2. Wire feeder 192 includes a consumable weld wire 214 wound about a bobbin 216 and supported in wire feeder 192 by a hub 218. A drive assembly 220 includes a motor 221 and a drive wheel 223 that feed weld wire 214 from bobbin 216 to a torch via a cable 222. A gas system 224 is positioned in housing 206 and communicates a shielding gas, such as weld-grade $CO_2$, to a weld. Gas system 224 has a regulator 226 attached to a pressure vessel 228 containing an amount of gas therein. It is understood that pressure vessel 228 could be any shape and oriented in substantially any position relative to wire feeder 192. Additionally, although pressure vessel 228 is shown as generally enclosed by housing 206 of wire feeder 192 when the cover is positioned thereon, it is understood that the pressure vessel could be positioned partially within housing 206 or supported externally therewith. The connection of pressure vessel 228 with wire feeder 192 forms a highly portable welding device having a source of shielding gas efficiently transportable therewith. A handle 230 extends from housing 206 and facilitates one-handed portability of the wire feeder.

A shroud 232 is positioned in internal cavity 210 of wire feeder 192. Shroud 232 is positioned adjacent a side panel 234 of housing 206 and has a first recess 236, a second recess 238, and a third recess 240 formed therein. First recess 236 is constructed to snuggly receive a portion of pressure vessel 228 therein, second recess 238 is constructed to snuggly receive a portion of an adapter 242 therein, and third recess 240 is constructed to snuggly receive a portion of regulator 226 therein. Recesses 236, 238, 240 cooperate to cradle and secure the respective components of gas system 224 therein.

Adapter 242 is constructed to operatively engage pressure vessel 228 and fluidly connect the pressure vessel to regulator 226 when the pressure vessel is attached to adapter 242. A hose 244 passes behind shroud 232 and fluidly connects regulator 226 to a valve 227 and therefrom to a torch. Valve 227 is connected to a switch 229 which extends through shroud 232 and allows an operator to operate valve 227 from a position remote from valve 227. Although valve 227 is shown positioned generally behind bobbin 216, alternatively, it is understood that valve 227 could be positioned to allow an operator direct manipulation thereof. Either construction provides a wire feeder having a quickly and efficiently replaceable source of the shielding gas. It is equally understood that rather than providing a shroud constructed to receive the internal components of the wire feeder, side panel 234 of housing 206 can be constructed with the plurality of recesses formed integral therewith.

A connector 250 extends from another valve 251 and passes through housing 206. Connector 250 is constructed to engage gas hose 207 of optional bulk gas system 201 when wire feeder 192 is connected therewith. It is understood that the engagement between connector 250 and gas hose 207 could be any of a quick-connector connection, a compression connection, a threaded connection, or any variation or combination thereof. Connector 250 is also fluidly connected to switch 229. An operator of wire feeder 192 can selectively connect wire feeder 192 to gas system 224, bulk gas system 201, or completely suspend any gas flow to wire feeder 192 through the manipulation of switch 229. Such a system allows an operator to control a flow of shielding gas from multiple sources from an individual location. Additionally, although wire feeder 192 includes a valve 227, 251 for each of the gas systems 201, 224, it is understood that a single manually controlled valve could have both gas systems connected thereto and constructed in such a manner as to allow flow from the gas systems individually or concurrently. Such a construction would allow an operator to maintain isolation of the gases of the gas systems or allow mixing of gases thereof when desired. It is also understood and within the scope of the claims that the wire feeder could automatically detect the connection of the bulk gas system therewith and fluidly connect the torch of wire feeder 192 to the bulk gas system when the wire feeder is fluidly connected therewith in one embodiment. The above configurations conserves the shielding gas of gas system 224 for operation of the wire feeder remote from bulk gas system 201 or when no shielding gas is available in a bulk gas system. It is further understood that the bulk gas system could be utilized to provide shielding gas to pressure vessel 228 of gas system 224. Such a construction would limit the replacement of pressure vessel 228 when the optional bulk gas system is available.

As shown in FIG. 1, a strap 248 has a first end 250 and a second end 252 secured about generally opposite sides of recess 236 with pressure vessel 228 securely retained thereby. Strap 248 is constructed of a generally elastic material and stretches over recess 236 with pressure vessel 228 positioned therein. Alternatively, strap 248 could be constructed from a more rigid material and have an end thereof removeably attached to shroud 232 such that the removable end of strap 248 could be engaged and disengaged from shroud 232 to allow the insertion/removal of pressure vessel 228 from recess 236. Alternatively, recess 236 could be constructed to snap-fittingly receive pressure vessel 228 therein. Regardless of which securing means is applied, when pressure vessel 228 is positioned in recess 236 of wire feeder 192, it is securely held therein to prevent inadvertent movement of the pressure vessel during transportation of the wire feeder while still allowing for quick and efficient removal and replacement of the pressure vessel. Such a construction forms a wire feeder remotely positionable relative to a welding-type power source and having a source of shielding gas securely transportable therewith.

Therefore, the present invention includes a wire feeder having a pressure vessel and wherein the wire feeder is constructed to provide a portable source of shielding gas to a weld. The pressure vessel is removeably supported by the wire feeder such that the wire feeder is efficiently and conveniently transportable by a single person and has a source of shielding gas securely supported thereby.

One embodiment of the present invention includes a wire feeder having a hub constructed to support a consumable weld wire. The wire feeder includes a drive assembly constructed to deliver the consumable weld wire to a weld and a housing positioned about the hub and drive assembly. A pressure vessel is supported by the wire feeder and is constructed to contain a gas therein. A valve is attached to the pressure vessel and is constructed to allow passage of the gas from the pressure vessel upon engagement of the pressure vessel with the wire feeder.

Another embodiment of the present invention includes a weld wire delivery system having a consumable weld wire supported in an enclosure and a receptacle formed in the enclosure. A drive mechanism is constructed to engage the consumable weld wire and deliver the consumable weld wire to a weld. A regulator is positioned in and supported by the receptacle of the enclosure.

A further embodiment of the present invention includes a wire feeder having a housing with a cavity formed therein. The cavity formed in the housing is constructed to receive a supply of a weld wire therein. A feed drive mechanism is in fluid communication with the cavity and is constructed to remove the weld wire therefrom. The wire feeder also includes first means for providing a shielding gas to a weld and second means for providing shielding gas to a weld. The first providing means originating in the housing and the second providing means originating outside the housing.

The present invention has been described in terms of the preferred embodiment, and it is recognized that equivalents, alternatives, and modifications, aside from those expressly stated, are possible and within the scope of the appending claims.

What is claimed is:

1. A wire feeder comprising:
   a hub constructed to support a consumable weld wire;
   a drive assembly constructed to deliver the consumable weld wire to a weld;
   a shroud constructed to accommodate positioning of a spool containing the consumable weld wire on the hub;
   a housing positioned about the hub, the drive assembly, and the shroud;
   a pressure vessel supported by the shroud and constructed to contain a gas therein; and
   a valve attached to the pressure vessel and constructed to allow passage of the gas therefrom upon engagement of the pressure vessel with the wire feeder;
   wherein the shroud has a recess formed therein, the recess constructed to snuggly receive at least one of the pressure vessel and a regulator.

2. The wire feeder of claim 1 further comprising a regulator fluidly connected to the pressure vessel and constructed to regulate the flow of gas therefrom.

3. The wire feeder of claim 2 further comprising a nipple extending from the regulator, the nipple constructed to engage the valve of the pressure vessel and allow the passage of gas therefrom upon connection of the pressure vessel to the regulator.

4. The wire feeder of claim 1 wherein the shroud is positioned adjacent a side panel of the housing and includes a plurality of recesses therein.

5. The wire feeder of claim 1 wherein the wire feeder is incapable of generating a welding power and further comprises a cable constructed to connect the wire feeder to a power source constructed to generate a power suitable for welding applications.

6. The wire feeder of claim 1 further comprising a connector having a passage therethrough, the connector constructed to fluidly connect the wire feeder to a bulk gas cylinder.

7. The wire feeder of claim 6 further comprising a selector valve operatively connecting a flow of gas from at least one of the pressure vessel and the bulk gas cylinder to the wire feeder.

8. The wire feeder of claim 1 wherein the pressure vessel is positioned in at least one of inside the housing, partially within the housing, and external to the housing.

9. A weld wire delivery system comprising:
a housing having a cavity formed therein;
a consumable weld wire supported in the housing;
a drive mechanism constructed to engage the consumable weld wire and deliver the consumable weld wire to a weld;
a shroud positioned in the housing and having a recess formed therein; and
a regulator positioned in and supported by the recess of the shroud.

10. The weld wire delivery system of claim 9 further comprising a gas container fluidly connected to the regulator and constructed to deliver a weld-grade shielding gas thereto.

11. The weld wire delivery system of claim 9 wherein the shroud has another recess formed therein, the another recess constructed to snuggly receive a gas container therein.

12. The weld wire delivery system of claim 11 further comprising another gas container attached to the weld wire delivery system and external to the housing.

13. The weld wire delivery system of claim 12 further comprising at least one of a valve fluidly connected to at least one of the gas container and the another gas container, the valve constructed to allow an operator to operatively select at least one of the gas container and the another gas container to provide a shielding gas to a weld, and a switch connected to a first valve connected to the gas container and a second valve connected to the another gas container, the switch constructed to allow an operator to remotely operate both the first valve and the second valve.

14. The weld wire delivery system of claim 9 wherein the weld wire delivery system is incapable of generating a welding power and is incorporated into a welding system having a power source remotely connectable to the weld wire delivery system, the power source constructed to generate the welding power suitable for welding applications and communicate the power signal to the weld wire delivery system.

15. The weld wire delivery system of claim 9 further comprising a pressure vessel engageable with the regulator, the regulator having a nipple extending therefrom constructed to operatively engage a valve of the pressure vessel connected thereto.

16. A wire feeder comprising:
a suitcase-type housing having a shape to compactly enclose the wire feeder and a cavity formed therein, the cavity constructed to receive a supply of a weld wire therein and the suitcase-type housing having two connected side shells;
a feed drive mechanism in fluid communication with the cavity and constructed to remove the weld wire therefrom;
first means for providing a shielding gas to a weld, the first providing means originating in the housing; and
second means for providing shielding gas to a weld, the second providing means originating outside the housing.

17. The wire feeder of claim 16 wherein at least one of the first providing means and the second providing means is further defined as at least one of a pressure vessel, a gas container, and a gas cylinder.

18. The wire feeder of claim 16 further comprising means for controlling a flow of gas from at least one of the first providing means and the second providing means.

19. The wire feeder of claim 18 wherein the controlling means further includes at least one of a valve, a switch, and a regulator.

20. The wire feeder of claim 16 further comprising a cord extending from the wire feeder to an external power source, the cord constructed to communicate a welding power from the power source to the wire feeder.

21. The wire feeder of claim 16 wherein the housing has another cavity formed therein, the another cavity constructed to receive at least a portion of the first providing means therein.

22. The wire feeder of claim 16 further comprising a strap having a first end pivotally attached to the housing and a second end removeably attachable to the housing such that the first providing means is positioned snuggly between the first and second ends.

23. A wire feeder comprising:
a housing having a cavity formed therein, the cavity constructed to receive a supply of a weld wire therein;
a feed drive mechanism in fluid communication with the cavity and constructed to remove the weld wire therefrom;
first means for providing a shielding gas to a weld, the first providing means originating in the housing;
second means for providing shielding gas to a weld, the second providing means originating outside the housing; and
a strap having a first end pivotally attached to the housing and a second end removeably attachable to the housing such that the first providing means is positioned snuggly between the first and second ends.

24. A wire feeder comprising:
a hub constructed to support a consumable weld wire;
a drive assembly constructed to deliver the consumable weld wire to a weld;
a shroud constructed to accommodate positioning of a spool containing the consumable weld wire on the hub;
a housing positioned about the hub, the drive assembly, and the shroud;
a pressure vessel supported by the shroud and constructed to contain a gas therein;
a valve attached to the pressure vessel and constructed to allow passage of the gas therefrom upon engagement of the pressure vessel with the wire feeder;
a regulator fluidly connected to the pressure vessel and constructed to regulate the flow of gas therefrom; and
a nipple extending from the regulator, the nipple constructed to engage the valve of the pressure vessel and allow the passage of gas therefrom upon connection of the pressure vessel to the regulator.

25. A wire feeder comprising:
a hub constructed to support a consumable weld wire;
a drive assembly constructed to deliver the consumable weld wire to a weld;
a shroud constructed to accommodate positioning of a spool containing the consumable weld wire on the hub, wherein the shroud is positioned adjacent a side panel of the housing and includes a plurality of recesses therein;
a housing positioned about the hub, the drive assembly, and the shroud;
a pressure vessel supported by the shroud and constructed to contain a gas therein; and
a valve attached to the pressure vessel and constructed to allow passage of the gas therefrom upon engagement of the pressure vessel with the wire feeder.

* * * * *

UNITED STATES PATENT AND TRADEMARK OFFICE
CERTIFICATE OF CORRECTION

PATENT NO.        : 7,423,238 B2                                         Page 1 of 1
APPLICATION NO.   : 10/906762
DATED             : September 9, 2008
INVENTOR(S)       : Stanzel et al.

It is certified that error appears in the above-identified patent and that said Letters Patent is hereby corrected as shown below:

Col. 4, line 45, after "welding" and before "plurality" insert -- device 10 exposes power supply 74 of welding device 10. Power supply 74 includes a --.

Signed and Sealed this

Eighteenth Day of November, 2008

JON W. DUDAS
*Director of the United States Patent and Trademark Office*